(12) United States Patent
Andres

(10) Patent No.: US 11,479,195 B2
(45) Date of Patent: Oct. 25, 2022

(54) CRASH SENSOR SYSTEM FOR DETERMINING CRASH EVENTS INDEPENDENT OF POLARITY OF SATELLITE SENSORS

(71) Applicant: Continental Automotive Systems, Inc., Auburn Hills, MI (US)

(72) Inventor: Robert M Andres, Clarkston, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 651 days.

(21) Appl. No.: 16/458,339

(22) Filed: Jul. 1, 2019

(65) Prior Publication Data

US 2021/0001795 A1    Jan. 7, 2021

(51) Int. Cl.
    *B60R 22/00*        (2006.01)
    *B60R 21/0132*    (2006.01)
    *B60R 21/01*        (2006.01)
    *B60R 21/00*        (2006.01)

(52) U.S. Cl.
CPC .. *B60R 21/0132* (2013.01); *B60R 2021/0004* (2013.01); *B60R 2021/0006* (2013.01); *B60R 2021/01006* (2013.01); *B60R 2021/01013* (2013.01); *B60R 2021/01286* (2013.01)

(58) Field of Classification Search
CPC .... B60R 2021/0002; B60R 2021/0004; B60R 2021/0006; B60R 2021/01006; B60R 2021/01013; B60R 2021/01286; B60R 21/00; B60R 21/01; B60R 21/013; B60R 21/0132; B60R 21/01332; G01C 19/56
See application file for complete search history.

(56) References Cited

U.S. PATENT DOCUMENTS

| | | | |
|---|---|---|---|
| 5,746,444 A | * | 5/1998 | Foo ................... B60R 21/01336 340/436 |
| 8,725,311 B1 | * | 5/2014 | Breed ...................... A61B 5/11 701/1 |
| 2004/0217849 A1 | * | 11/2004 | Maehara ............. B60R 25/1004 340/426.1 |
| 2009/0276112 A1 | * | 11/2009 | Mack .................. B60R 21/0136 701/31.4 |
| 2013/0220031 A1 | * | 8/2013 | Ghannam ........... B60R 21/0136 73/862.381 |

FOREIGN PATENT DOCUMENTS

JP          2012159429 A   *   8/2012  ............ G01C 19/56

* cited by examiner

*Primary Examiner* — Adam M Alharbi

(57) ABSTRACT

A crash sensor system includes an electronic control unit (ECU). The ECU has an accelerometer to measure longitudinal acceleration of the vehicle. Front crash satellite sensors are mounted at the front of the vehicle to detect a front or a rear crash event. When a front or rear crash event occurs, the first accelerometer is utilized to determine if the crash occurred at the front or the rear of the vehicle, regardless of the polarity of the front crash satellite sensors.

14 Claims, 4 Drawing Sheets

| Left front satellite | | Right front satellite | | Current System | New System with polarity independence |
|---|---|---|---|---|---|
| Mounting on vehicle | Configured Correctly (Yes/No) | Mounting on vehicle | Configured Correctly (Yes/No) | Correct system performance (Yes/No) | Correct system performance (Yes/No) |
| Correct | Yes | Correct | Yes | Yes | Yes |
| Backwards | Yes | Correct | Yes | No | Yes |
| Correct | No | Correct | Yes | No | Yes |
| Backwards | No | Correct | Yes | Yes | Yes |
| Correct | Yes | Backwards | Yes | No | Yes |
| Backwards | Yes | Backwards | Yes | No | Yes |
| Correct | No | Backwards | Yes | No | Yes |
| Backwards | No | Correct | No | No | Yes |
| Correct | Yes | Correct | No | No | Yes |
| Backwards | Yes | Correct | No | No | Yes |
| Correct | No | Backwards | No | Yes | Yes |
| Backwards | Yes | Backwards | No | No | Yes |
| Correct | No | Backwards | No | No | Yes |
| Backwards | No | Backwards | No | Yes | Yes |

FIG. 2

CRASH SENSOR SYSTEM FOR DETERMINING CRASH EVENTS INDEPENDENT OF POLARITY OF SATELLITE SENSORS

FIELD

The invention relates to a crash sensor system that removes polarity (impact direction) dependence from calculations based on acceleration signals from front and side crash satellite sensors without any loss of crash discrimination performance.

BACKGROUND

The use of acceleration-based satellite sensors such as accelerometers to detect vehicle crashes is a common practice. Accelerometers are typically located at various points in the vehicle to provide the necessary information to an algorithm for making judgments about the predicted severity of on-going crash events.

Incorrect sensor polarity has been the topic for many safety related vehicle recalls over the years and continues to be a complex and difficult issue despite many best practices being put in place. Today's passive safety algorithms rely on inputs from the acceleration-based satellite sensors that are mounted in the vehicle's frontal crush zone. The front crash satellite sensors have a sensing axis and must be mounted such that the sensing axis is parallel to the crash direction that is being measured. The satellite sensors measure acceleration which inherently has a direction (i.e., polarity). Positive signals are experienced when an impact comes from one direction and negative signals are experienced when the impact comes from the opposite direction.

If the front satellite sensors are not properly configured or are mounted backwards and are providing incorrect signals to the front algorithm during a front crash, then the front algorithm will not perform as intended. This can lead to non-deployments, or late deployments in cases where an airbag deployment is desired.

If the side satellite sensors are not properly configured or are mounted backwards and are providing incorrect signals to the side algorithm during a side crash, then the side algorithm will not perform as intended. This can lead to restraint activations on the wrong side of the car. For example, a crash to the left side may result in the right side restraints being activated instead of the left side.

Thus, there is a need to provide a crash sensor system that removes polarity dependence from calculations based on acceleration signals from front and side crash satellite sensors without any loss of crash discrimination performance.

SUMMARY

An object of the invention is to fulfill the need referred to above. In accordance with the principles of the present invention, this objective is achieved by providing a crash sensor system for a vehicle, with the vehicle having a front, a rear, a left side and a right side. The system includes an electronic control unit (ECU) constructed and arranged to be disposed on the vehicle generally along a longitudinal axis of the vehicle. The ECU has a first accelerometer constructed and arranged to measure longitudinal acceleration of the vehicle during a crash event; a second accelerometer constructed and arranged to measure lateral acceleration of the vehicle during a crash event; and a processor circuit. At least a pair of front crash satellite sensors are electrically connected to the ECU and are constructed and arranged to be mounted at the front of the vehicle to detect a front or a rear crash event. Each of the front crash satellite sensors has a polarity defining a sensing direction. At least a pair of side crash satellite sensors are electrically connected to the ECU with one of the side crash satellite sensors being constructed and arranged to be mounted at the right side of the vehicle and the other side crash satellite sensor of the pair being constructed and arranged to be mounted to the left side of the vehicle to detect a side crash event. When a front or rear crash event occurs, the first accelerometer of the ECU is constructed and arranged to determine if the crash occurred at the front or at the rear of the vehicle, regardless of the polarity of the front crash satellite sensors. When a side crash event occurs, the processor circuit is constructed and arranged to determine a struck side of the vehicle independent of the second accelerometer of the ECU by summing an absolute value of all of the left side crash satellite sensors and comparing the sum to a summation of an absolute value from all of the right side crash satellite sensors, with the side with the largest summation being the struck side.

In accordance with another aspect of the invention, a method detects crash events of a vehicle, with the vehicle having a front, rear, left side and right side. The method mounts an electronic control unit (ECU) generally along a longitudinal axis of the vehicle. The ECU includes a first accelerometer constructed and arranged to measure longitudinal acceleration of the vehicle during a crash event; a second accelerometer constructed and arranged to measure lateral acceleration of the vehicle during a crash event; and a processor circuit. The method mounts at least a pair of front crash satellite sensors to the front of the vehicle to detect a front or a rear crash event, with each of the front crash satellite sensors being electrically connected to the ECU and having polarity defining a sensing direction. The method mounts at least a pair of side crash satellite sensors to the vehicle such that one of the side crash satellite sensors is mounted at the right side of the vehicle and the other side crash satellite sensor of the pair is mounted to the left side of the vehicle to detect a side crash event. Each side crash satellite sensor is connected to the ECU. When a front or rear crash event occurs, the method determines, by the first accelerometer of the ECU, whether the crash occurred at the front or at the rear of the vehicle, regardless of the polarity of the front crash satellite sensors.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which:

FIG. 2 is a chart showing the sixteen possible combinations for mounting two front satellite sensors on a vehicle, with only four resulting in the correct system behavior.

DETAILED DESCRIPTION OF EXEMPLARY EMBODIMENTS

Figure 1:
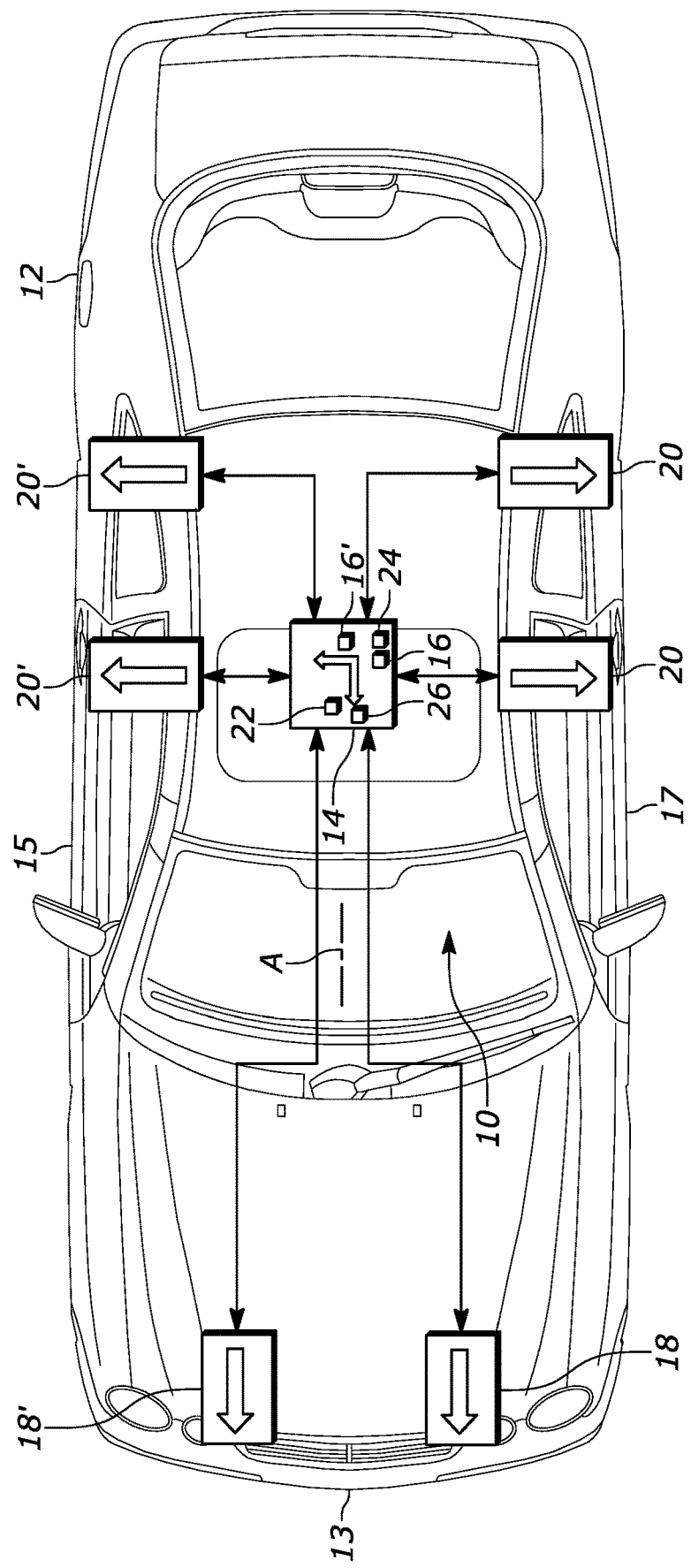
FIG. 1 is schematic view of a crash sensor system, for crash detection of a vehicle, provided in accordance with an embodiment of the invention.

With reference to FIG. 1, a crash sensor system is shown, generally indicated at 10, for crash detection of a vehicle 12. The system 10 uses accelerometers for the purpose of detecting vehicle crashes. The accelerometers are typically located at various points in the vehicle to provide the necessary information to an algorithm for making judgments about the predicted severity of on-going crash events. A main electronic control unit (ECU) 14 of a passive safety restraint system is typically located in the passenger compartment of the vehicle 12 on the floor between the two front seats, typically along a longitudinal axis A of the vehicle 12. This main ECU 14 contains accelerometers 16, 16' orientated to measure the respective longitudinal and lateral acceleration of the vehicle 12 during crash events.

In addition to the accelerometers 16, 16' in the main ECU 14, satellite sensors are located along the front end 13 and right side 15 and left side 17 of the vehicle 12, each being electrically connected with the ECU 14. In the embodiment, there are two acceleration-based satellite sensors 18, 18' at the front end 13 orientated to measure the longitudinal acceleration of the vehicle 12. In addition, there are two satellite sensors 20, 20" along each of the right and left sides of the vehicle 12. These satellite sensors 20, 20' are either pressure-based, to measure the pressure change inside a door cavity during a side crash, or acceleration-based (e.g., accelerometer) to measure the lateral acceleration of the vehicle 12.

Typically, the main restraint ECU 14 is configured by software to indicate which sensing direction is positive for each satellite sensor 18, 18' and 20, 20'. The configuration is necessary to allow for different sensor installations on different vehicles. This is referred to as the "polarity" of the satellite sensor and is either configured as "inverted" or "not inverted". If a satellite sensor is configured to be "inverted" then its signal is multiplied by a "−1" before it is provided to the crash detection algorithm executed by a processor circuit 22 of the ECU 14.

For a conventional crash sensor system to behave as intended, all accelerometer type satellite sensors must be mounted to the vehicle with the correct sensing direction and must also be configured with the correct corresponding polarity in the ECU software. For example, a front crash system requires that both the left front satellite sensor 18 and the right front satellite sensor 18' are mounted and configured correctly. There are sixteen possible combinations of mounting and configuring the two satellite sensors 18, 18'. Only four out of the sixteen possible combinations will result in the correct system behavior, as shown in the chart of FIG. 2. In accordance with an embodiment, once the polarity is removed from the calculations of the satellite sensors as explained more fully below, then the correct system behavior will occur in all sixteen possible combinations.

It is common practice to perform basic calculations on the accelerometer signals before using them in a crash detection algorithm. One common calculation method is to put the signal through a low pass filter with a configurable cut-off frequency. Another common calculation method is to perform a damped integration on the acceleration signal to get a representation of the change in velocity at that sensor location experienced during the crash. Both the filter and the integration calculations depend on the polarity of the signal, and will not give the correct result if the sensor 18, 18' is mounted backwards or configured incorrectly.

Maintaining the polarity of the front crash satellite sensors 18, 18' is only necessary if the satellite's polarity is needed to determine if the crash is occurring at the front or the rear of the vehicle 12. In accordance with an embodiment of the system 10, the longitudinal accelerometer 16 in the main restraints ECU 14 can be used to determine if the crash is at the front or rear of the vehicle. Therefore it is not necessary to maintain the polarity at the front crash satellite sensors 18, 18'. Through simple calculations, the polarity can be removed and the need for correct polarity configuration is also eliminated. Consequently, the risk of incorrect system performance in a front or rear crash due to a misconfigured or backwards mounted satellite sensor 18, 18' is also eliminated.

To remove the polarity dependence from calculations such as the low pass filter and the damped integration, it is enough to perform these calculations on both the inverted and non-inverted signals and then take the maximum of the two. This resulting signal can be used for both the front and rear crash detection algorithms. The longitudinal signal from sensor 16 at the main ECU 14 determines if the crash is at the front or rear of the vehicle 12.

Figure 3:
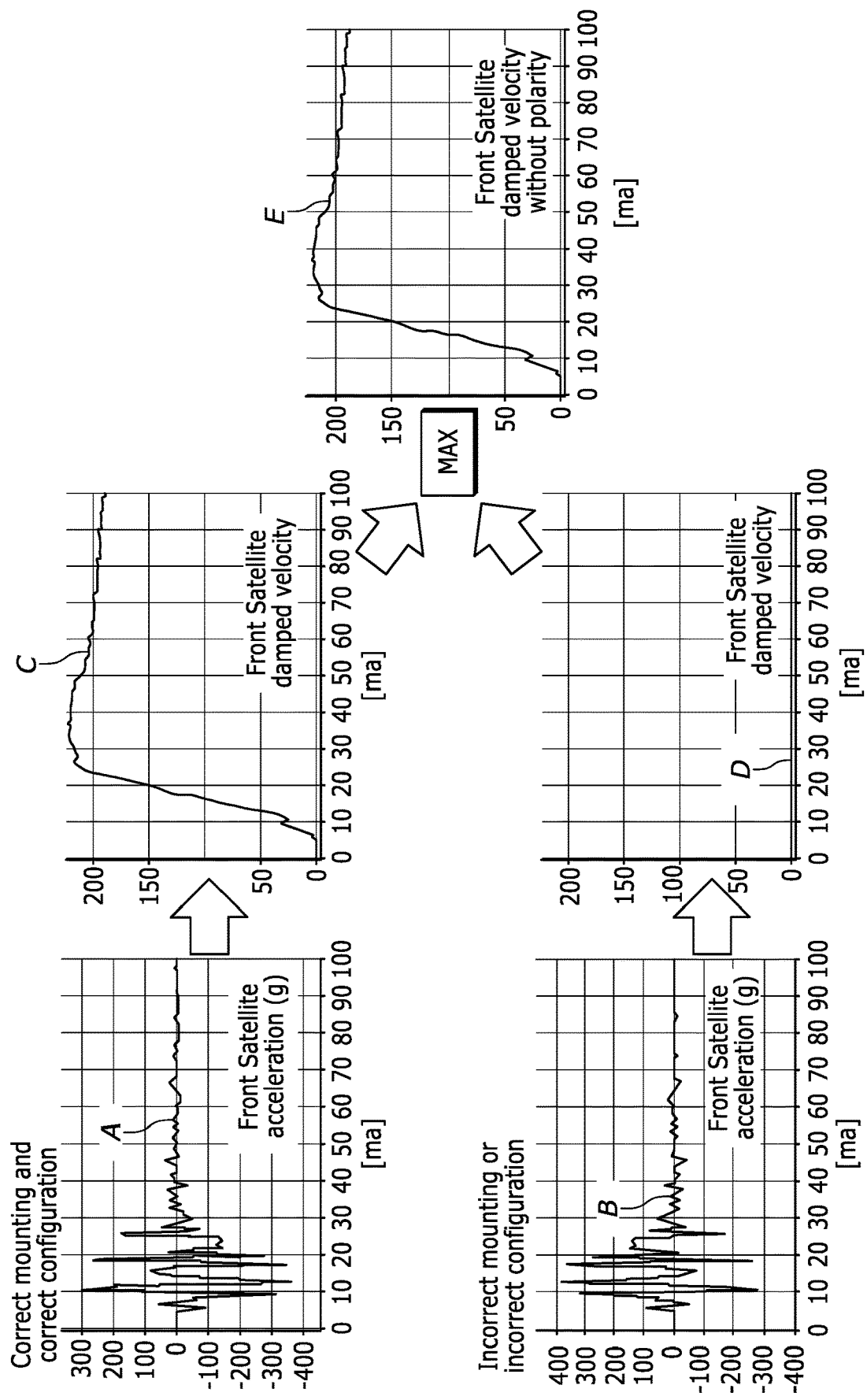
FIG. 3 shows an example of a signal from a front satellite sensor taken from a front wall crash in its correct form and in its incorrect form, with the corresponding damped velocity properties shown and the maximum between these two, yields the final damped velocity property that is independent of polarity.

FIG. 3 shows an example of a signal from a front satellite sensor 18 taken from a front wall crash. The signal is shown in its correct form (correct mounting and configuration) as signal A, and in its incorrect form (incorrect mounting or incorrect configuration) as signal B. The signal B can be created from the original incoming signal by simply inverting it. This is accomplished by multiplying the incoming signal A by −1. Conventional damped integration of signals A and B is performed by integrator 24. The integrator 24 can be considered to be part of the processor circuit 22. The corresponding damped velocity properties C and D are shown and the maximum between the two yields the final damped velocity property E that is independent of polarity and can be used by the front and rear crash detection algorithms executed by the processor circuit 22 for signaling deployment of crash protection such as airbags. It is easy to see that the damped velocity property E without polarity is the same as the damped velocity property C that is calculated when the mounting and configuration are correct.

Figure 4:
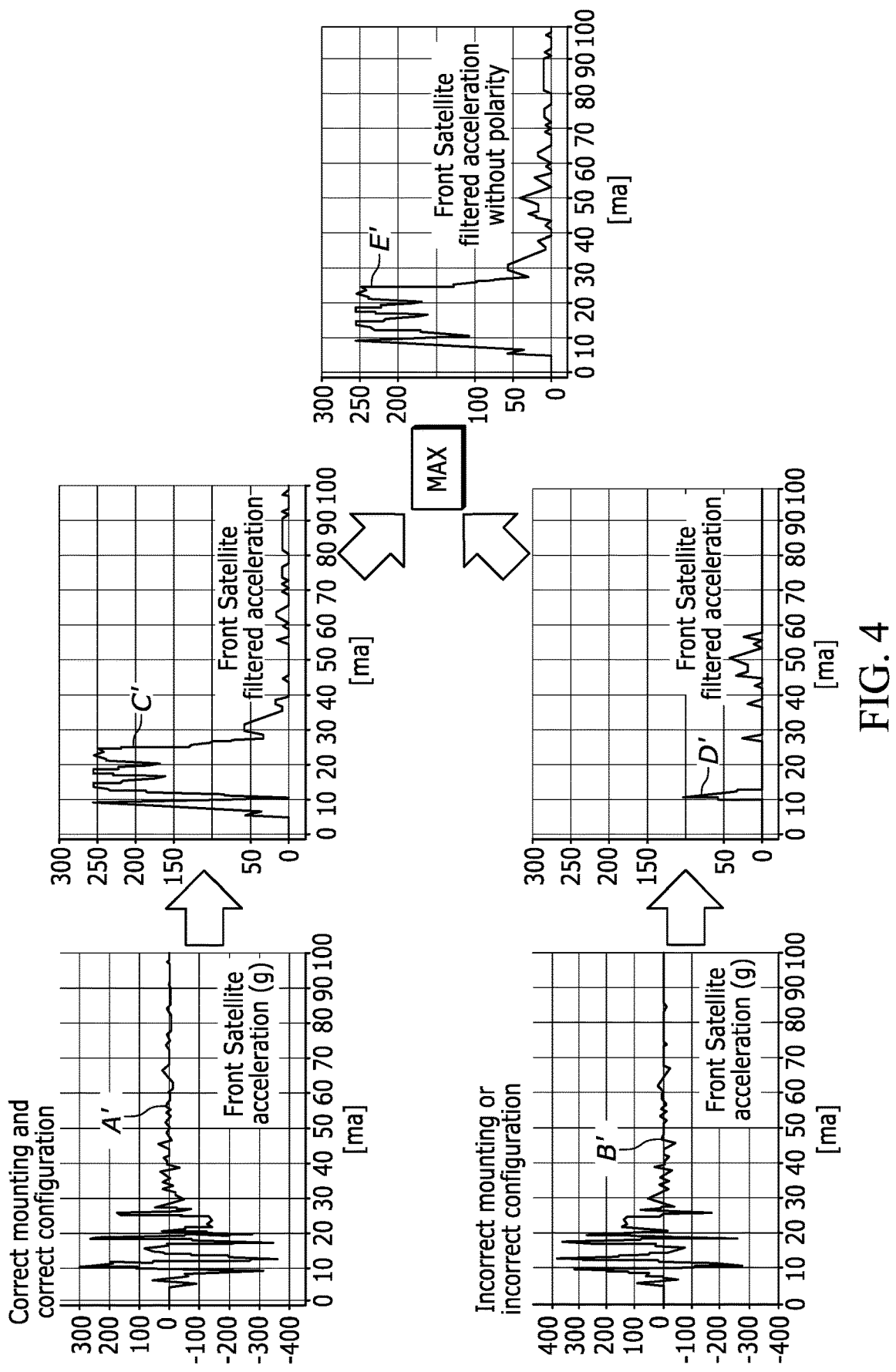
FIG. 4 shows an example of a signal from a front satellite sensor taken from a front wall crash in its correct form and in its incorrect form, with the corresponding filtered acceleration properties shown and the maximum between these two, yields the final filtered acceleration property that is independent of polarity.

FIG. 4 shows an example using a signal from the same crash but this time examining the filtered satellite acceleration calculated property upon passing through filter 26. Once again, the signal is shown in its correct form (correct mounting and configuration) as signal A', and in its incorrect form (incorrect mounting or incorrect configuration) as signal B' obtained as noted above. The signals A' and B' are conventionally filtered in low pass filter 26. The corresponding filtered acceleration properties C' and D' are shown and the maximum between the two yields the final filtered acceleration property E' that is independent of polarity and can be used by the front and rear crash detection algorithms executed by the processor circuit 22 for signaling deployment of crash protection such as airbags. The filtered acceleration property E' without polarity is nearly the same as the filtered acceleration property C' that is calculated when the mounting and configuration are correct. The minor differences are not expected to affect the final system performance.

Since the calculated properties E, E' without polarity are nearly the same as the properties C, C' when the mounting and configuration are correct, the overall system performance will not be degraded as long as the longitudinal accelerometer 16 in the main restraints ECU 14 is used to determine if the crash is at the front or rear of the vehicle. Thus the risk for a vehicle safety recall is greatly reduced without any loss of performance. However, there is a slight increase in the number of processor circuit calculations.

The description above deals with front crash satellite sensors 18, 18'. It is more difficult to remove the polarity from the side crash satellite sensors 20, 20' because the signal from the lateral acceleration sensor 16' at the main restraints ECU 14 does not respond fast enough to provide an accurate indication of the struck side before restraint activation is needed. Therefore, the signals from the side satellite sensors 20, 20' are needed to determine which side of the vehicle 12 is being struck independent of lateral acceleration sensor 16'. This is accomplished by an embodiment by summing the absolute value of all left side crash satellite sensors 20 and comparing it to the summation of the absolute value from all right side crash satellite sensors 20' in the processor circuit 22. The side with the largest summation is the struck side. Larger signals are expected on the struck side due to the close proximity of the impact. A hysteresis function can be used to prevent unwanted switching of the struck side. As noted above, these satellite sensors 20, 20' are either pressure-based or acceleration-based (e.g., accelerometer). When the sensors 20, 20' are accelerometers, the summation and comparison described above determines the struck side of the vehicle, regardless of the polarity of the sensors 20, 20'. Pressure sensors are immune to the effects of polarity, but the summation and comparison described above can determine the struck side of the vehicle using pressure sensors.

Once the struck side of the vehicle 12 is determined, similar property calculations as described above for front crash satellites 18, 18' can be used for the side crash satellite sensors 20, 20' on each side of the vehicle 12. This includes performing the standard property calculations on both the inverted and non-inverted satellite signals and then take the maximum of the two for the struck side and the minimum for the unstruck side. One potential weakness to this strategy for side crash detection is the rare case where both sides of the vehicle are struck at exactly the same time. This could result in a slight delay to activate the airbags on one side of the vehicle.

The operations and algorithms described herein can be implemented as executable code within the ECU 14 having the processor circuit 22 as described, or stored on a standalone computer or machine readable non-transitory tangible storage medium that are completed based on execution of the code by a processor circuit implemented using one or more integrated circuits. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a micro-processor circuit (not shown) and implemented using one or more integrated circuits, where execution of executable code stored in an internal memory circuit causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit can be implemented, for example, using a non-volatile memory such as a programmable read only memory (PROM) or an EPROM, and/or a volatile memory such as a DRAM, etc.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A crash sensor system for a vehicle, the crash sensor system comprising:

an electronic control unit (ECU), the ECU comprising an accelerometer arranged to measure longitudinal acceleration of the vehicle and output a longitudinal signal corresponding to the longitudinal acceleration of the vehicle;

a pair of front crash satellite sensors electrically connected to the ECU and mounted at a front of the vehicle, the pair of front crash satellite sensors configured to output longitudinal signals corresponding to the longitudinal acceleration of the vehicle; and plurality of side crash satellite sensors electrically connected to the ECU, the plurality of side crash satellite sensors comprising:

a pair of right side crash satellite sensors mounted at a right side of the vehicle, the pair of right side crash satellite sensors configured to output right side latitudinal signals corresponding to a latitudinal acceleration of the vehicle, and a pair of left side crash satellite sensors mounted to a left side of the vehicle, the pair of left side crash satellite sensor configured to output left side latitudinal signals corresponding to the latitudinal acceleration of the vehicle, wherein the ECU is configured to execute a crash detection algorithm to determine whether a crash event of the vehicle is a front crash event at a front of the vehicle or a rear crash event at a rear of the vehicle based on a polarity of the longitudinal signal output by the first accelerometer and values of the longitudinal signals output by the pair of front ash satellite sensors independent of polarity, and wherein the ECU is configured to execute the crash detection algorithm to determine whether the crash event of the vehicle is a left side crash event as the left side of the vehicle or a right side crash event at the right side of the vehicle based on absolute values of the left side latitudinal signals and absolute values of the right side latitudinal signals.

2. The system of claim 1, wherein each front crash satellite sensor of the pair of front crash satellite sensors is an accelerometer.

3. The system of claim 1, wherein each side crash satellite sensor of the plurality of side crash satellite sensors is an accelerometer having a polarity defining a sensing direction.

4. The system of claim 1, wherein each side crash satellite sensor of the plurality of side crash satellite sensors is a pressure sensor.

5. The system of claim 1, wherein the ECU is configured to, when the front crash event or the rear crash event occurs, based on each longitudinal signal among the longitudinal signals output by the pair of front crash satellite sensors, create a second signal, inverted from each longitudinal signal, calculate a corresponding damped velocity property for each longitudinal signal and the second signal, and calculate a maximum between the two calculated damped velocity properties to yield a final damped velocity property without regard to a polarity of the pair of front crash satellite sensors so that the final damped velocity property can be used in further processing of crash detection.

6. The system of claim 1, wherein the ECU comprises a filter for filtering the longitudinal signals, the left side latitudinal signals, and the right side latitudinal signals, and
wherein the ECU is configured to, when the front crash event or the rear crash event occurs, based on each longitudinal signals among the longitudinal signals output by the pair of front crash satellite sensors that is filtered in the filter, create a second signal, inverted from each longitudinal signal, calculate a corresponding filtered acceleration property for each longitudinal signal and the second signal, and calculate a maximum between the two calculated filtered acceleration properties to yield a final filtered acceleration property without regard to a polarity of the pair of front crash satellite sensors so that the final filtered acceleration property can be used in further processing of crash detection.

7. The system of claim 1, wherein the ECU is mounted in a passenger compartment of the vehicle between two front seats of the vehicle, and
wherein the pair of front crash satellite sensors comprises a left front crash satellite sensor mounted on a front left portion of the vehicle and a right front crash satellite sensor mounted on a front right portion of the vehicle.

8. A crash sensor system for a vehicle, the crash sensor system comprising:
an electronic control unit (ECU), the ECU comprising a first accelerometer arranged to measure longitudinal acceleration of the vehicle and output a longitudinal signal corresponding to the longitudinal acceleration of the vehicle; and
a pair of front crash satellite sensors electrically connected to the ECU and mounted at a front of the vehicle, the pair of front crash satellite sensors configured to output longitudinal signals corresponding to the longitudinal acceleration of the vehicle,
wherein the ECU is configured to execute a crash detection algorithm to determine whether a crash event of the vehicle is a front crash event at a front of the vehicle or a rear crash event at a rear of the vehicle based on a polarity of the longitudinal signal output by the first accelerometer and values of the longitudinal signals output by the pair of front crash satellite sensors independent of polarity.

9. The crash sensor system of claim 8, wherein each front crash satellite sensor of the pair of front crash satellite sensors is an accelerometer.

10. The crash sensor system of claim 9, wherein the ECU is configured to invert each longitudinal signal among the longitudinal signals, perform damped integration on the longitudinal signals and the inverted longitudinal signals, determine a final damped velocity property based on the damped integration on the longitudinal signals and the inverted longitudinal signals, and determine whether the crash event of the vehicle is the front crash event at the front of the vehicle or the rear crash event at the rear of the vehicle based on the final damped velocity property.

11. The crash sensor system of claim 9, wherein the ECU is configured to invert each longitudinal signal among the longitudinal signals, low pass filter the longitudinal signals and the inverted longitudinal signals, determine a filtered acceleration property based on the low pass filtering on the longitudinal signals and the inverted longitudinal signals, and determine whether the crash event of the vehicle is the front crash event at the front of the vehicle or the rear crash event at the rear of the vehicle based on the filtered acceleration property.

12. A method of a crash detection algorithm for determining whether a crash event of a vehicle is a front crash event at a front of the vehicle or a rear crash event at a rear of the vehicle, the method comprising:
detecting, by a first accelerometer of an electronic control unit (ECU), longitudinal acceleration of the vehicle and outputting a longitudinal signal corresponding to the longitudinal acceleration of the vehicle;
detecting, by a pair of front crash satellite sensors mounted at a front of the vehicle, the longitudinal acceleration of the vehicle and outputting longitudinal signals corresponding to the longitudinal acceleration of the vehicle; and
determining whether the crash event of the vehicle is the front crash event at the front of the vehicle or the rear crash event at the rear of the vehicle based on a polarity of the longitudinal signal output by the first accelerometer and values of the longitudinal signals output by the pair of front crash satellite sensors independent of polarity.

13. The method of claim 12, wherein the determining comprises:
inverting each longitudinal signal among the longitudinal signals;
performing damped integration on the longitudinal signals and the inverted longitudinal signals;
determining a final damped velocity property based on the damped integration on the longitudinal signals and the inverted longitudinal signals; and
determining whether the crash event of the vehicle is the front crash event at the front of the vehicle or the rear crash event at the rear of the vehicle based on the final damped velocity property.

14. The method of claim 12, wherein the determining comprises:
inverting each longitudinal signal among the longitudinal signals;
low pass filtering the longitudinal signals and the inverted longitudinal signals;
determining a filtered acceleration property based on the low pass filtering on the longitudinal signals and the inverted longitudinal signals, and determining whether the crash event of the vehicle is the front crash event at the front of the vehicle or the rear crash event at the rear of the vehicle based on the filtered acceleration property.

* * * * *